P. F. HODGES.
Harvester Rake.
No. 103,185.  Patented May 17, 1870.
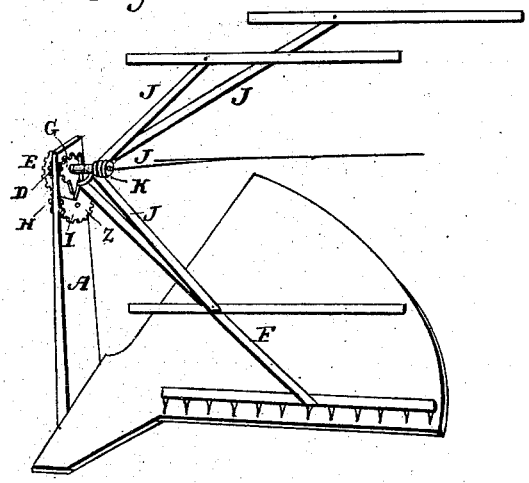
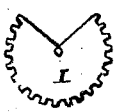
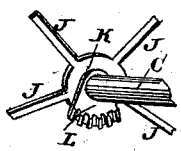
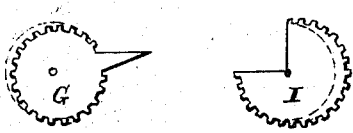
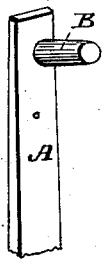
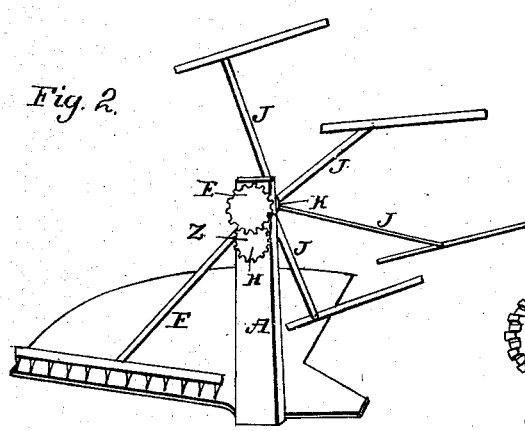
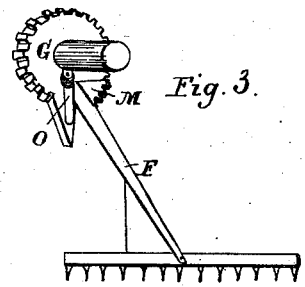
Attest:
L. F. Harson
S. P. Hodges
Inventor:
P. F. Hodges

United States Patent Office.

PLINY F. HODGES, OF MOLINE, ILLINOIS.

Letters Patent No. 103,185, dated May 17, 1870.

IMPROVEMENT IN COMBINED RAKE AND REEL FOR HARVESTERS.

The Schedule referred to in these Letters Patent and making part of the same

I, PLINY F. HODGES, of Moline, in the county of Rock Island and State of Illinois, have invented certain Improvements in a Combined Rake and Reel for Harvesting-Machines, of which the following is a specification.

My invention relates to the combination of mechanism with a rake and reel for harvesting-machines, in such a manner that it shall cause the rake to make a corresponding revolution with the reel, and also sweep the grain from the platform in the arc of a circle, while passing over the same, as will be explained.

In the accompanying drawings—

Figure 1 is a view of the rake and reel as attached to the platform of a harvesting-machine, and embodying my invention.

Figure 2 is a side view of the same, showing the position of the rake at the rear end of the platform.

Figure 3 is a view of the rake and wheel to which the rake is attached by means of a hinge.

Figure 4 is a section of the reel-shaft, showing the reel-arms and a segment of a bevel-wheel attached to the reel-boss.

Figure 5 is a side view, next to the reel-post, of the spur-wheel, which supports the rake, showing an elongated cog.

Figure 6 is a side view of a sectoral spur-wheel, showing an open space which admits the elongated cog, shown in fig. 5, when the wheels are in motion.

Figure 7 is a view of a section of the reel-post, showing a sleeve fixed thereon in which the reel-shaft turns, and around which the rake is revolved.

Figure 8 represents a modification of the wheels, shown in figs. 5 and 6.

A is a reel-post, to which the sleeve B is fixed.

C is a reel-shaft, which receives motion from a chain-wheel, E, which is provided with a spur-wheel, D, upon the inner side thereof, and attached to the outer end of the shaft C, and, by a chain-belt, connected with a similar wheel upon the driving-shaft of the harvester, by means of which, aided by the wheels D, H, I, and G, the rake and reel receive independent rotary motion.

The above arrangement of the sheave is particularly adapted to a rigid-bar machine, but in most cases I prefer to drive the rake and reel from the countershaft.

The rake F is secured to the wheel G by means of the hinge O. The bearing of the wheel G extends the whole length of the sleeve B, and thus prevents the rake from sliding upon the sleeve longitudinally.

The spur-wheel H is equal in diameter with the wheel D, and is secured to a shaft, Z, which passes through the reel-post A at a point below the reel-shaft C, so that the cogs of the wheels D and H shall operate together.

Upon the end of the shaft Z, which is on the inner side of the reel-post A, is fixed a sectoral spur-wheel, I, which acts upon the wheel G.

The reel-arms J are secured to a reel-boss, K, to which is also attached a segment of a bevel-wheel, L, as shown in fig. 4.

Upon the rake-arm F is also fixed a corresponding segment of bevel-gear, M, which is operated by the segment L.

When the chain-wheel E is turned, the rake F is caused, by the action of the wheels described, to revolve around the stationary sleeve B, and assume a position as part of the reel, until it reaches a point over the forward end of the platform, when the elongated cog of the wheel G, to which the rake is hung, passes into the open space of the sectoral wheel I, and resting near the center of said wheel, is thereby held in a stationary position while the sectoral wheel I traverses the distance of the open space in said wheel, during which time the rake F is caused, by the action of the beveled segments L and M, to turn upon the hinge O, horizontally, over the platform, and sweep the grain therefrom, delivering the same at the side of the machine opposite to the standing grain.

I have shown the reel supported upon one side only of the platform, but, by providing a suitable bearer, and extending the reel-shaft C across the platform, it may be supported upon both sides thereof.

The beveled segments L and M have been described as of equal dimensions, and, when so constructed, the velocity of the rake while passing over the platform will be equal to the speed of the reel. But it is evident that the said segments may be constructed of different radii, and the larger one placed upon the rake-arm, and that the wheels D and H may be fixed upon their respective shafts, correspondingly, to one side of their respective centers, for the purpose of retarding the motion of the sectoral wheel I during the passage of the rake over the platform, and that, when so constructed and arranged, the velocity of the rake, while traversing the platform, will be correspondingly less than the speed of the reel.

This differential speed may be used to advantage in heavy grain, where it is necessary to increase the velocity of the reel in order to obtain bundles of a proper size.

The rake may be hung in either of the two positions, as shown in figs. 1 and 3.

When arranged as shown in fig. 1, the cogs of the bevel segments must be constructed obliquely thereto. I prefer the position shown in fig. 3.

The differential wheels G and I may be constructed as shown in fig. 8, being pivoted eccentrically upon their shafts, and, if desired, being slightly oval in form; and, when so made and used, the rake will assume a radial position with the reel-arms, when the revolution is three-quarters accomplished, and from that point revolve at the same speed with the reel. I prefer the construction shown in figs. 5 and 6.

The sweep of the rake can be increased or diminished by adjusting the bevel segment on the reel-boss for that purpose.

I claim as my invention—

1. The combination, substantially as set forth, of an intermittently-revolving rake, a continuously-revolving reel, and a sectoral wheel and pinion.

2. In combination with the elements enumerated in the first clause of claim, the bevel segments L and M, substantially as and for the purpose set forth.

3. The combination, substantially as set forth, of an intermittently-revolving rake, a continuously-revolving reel, and the wheels D, H, I, and G.

4. In combination with the elements enumerated in the last preceding clause, the bevel segments L and M, substantially as and for the purpose set forth.

PLINY F. HODGES.

Witnesses:
SAMUEL P. HODGES,
LEVI F. HARSON.